(12) United States Patent
Kuehn et al.

(10) Patent No.: US 12,420,958 B2
(45) Date of Patent: Sep. 23, 2025

(54) UNIVERSAL CUBESAT DISPENSING DEVICE AND METHOD

(71) Applicant: Stardust Holdings, LLC, Austin, TX (US)

(72) Inventors: Alex Amelia Kuehn, Austin, TX (US); Tyler Gerald Holden, Bastrop, TX (US)

(73) Assignee: Stardust Holdings, LLC, Austin, TX (US)

(*) Notice: Subject to any disclaimer, the term of this patent is extended or adjusted under 35 U.S.C. 154(b) by 0 days.

(21) Appl. No.: 18/418,105

(22) Filed: Jan. 19, 2024

(65) Prior Publication Data

US 2024/0246702 A1    Jul. 25, 2024

Related U.S. Application Data

(60) Provisional application No. 63/440,089, filed on Jan. 19, 2023.

(51) Int. Cl.
| | |
|---|---|
| *B64G 1/66* | (2006.01) |
| *B64G 1/00* | (2006.01) |
| *B64G 1/10* | (2006.01) |
| *B64G 1/22* | (2006.01) |

(52) U.S. Cl.
CPC .............. *B64G 1/66* (2013.01); *B64G 1/005* (2013.01); *B64G 1/10* (2013.01); *B64G 1/223* (2023.08)

(58) Field of Classification Search
CPC .......... B64G 1/643; B64G 1/641; E05D 3/08; E05D 7/00
See application file for complete search history.

(56) References Cited

U.S. PATENT DOCUMENTS

| | | | |
|---|---|---|---|
| 9,415,883 B2* | 8/2016 | Holemans | B64G 1/641 |
| 10,370,124 B2* | 8/2019 | Dube | B64G 1/002 |
| 10,981,679 B2* | 4/2021 | Beck | F16C 29/005 |
| 11,059,609 B2* | 7/2021 | Beck | F16C 29/005 |
| 11,588,221 B1* | 2/2023 | Ray | H01Q 11/08 |
| 2014/0319283 A1 | 10/2014 | Holemans et al. | |
| 2019/0039757 A1 | 2/2019 | Beck et al. | |
| 2022/0106063 A1* | 4/2022 | Johnson | B64G 1/6457 |
| 2022/0267032 A1* | 8/2022 | Johnson | B64G 1/644 |

OTHER PUBLICATIONS

EXOPod NOVA User Manual. Revision 1.0. Sep. 2022. (Year: 2022).*

* cited by examiner

*Primary Examiner* — Joshua J Michener
*Assistant Examiner* — Michael B. Kreiner
(74) *Attorney, Agent, or Firm* — HULSEY P.C.

(57) ABSTRACT

This disclosure relates generally to a modular CubeSat dispenser with novel features that enable universal compatibility within a single CubeSat dispenser system. The apparatus of the invention is particularly useful for 10 CubeSat dispensers and other standardized deployment devices.

17 Claims, 3 Drawing Sheets

UNIVERSAL CUBESAT DISPENSING DEVICE AND METHOD

CROSS-REFERENCE TO RELATED APPLICATIONS

The present application claims the benefit of U.S. Provisional Application No. 63/440,089, filed Jan. 19, 2023; all of which is incorporated herein by reference.

FIELD OF THE INVENTION

This disclosure relates generally to a modular CubeSat dispensing device with novel features that enable universal compatibility within a single CubeSat dispenser system.

BACKGROUND OF THE INVENTION

Since the earliest days of spaceflight, satellites have typically been deployed from a parent spacecraft or launch vehicle. Larger satellites (e.g., >1000 kg) may often times be deployed directly from a launch vehicle into a desired orbit whereas smaller satellites, such as nanosatellites (e.g., 1-10 kg) may be deployed from a parent spacecraft that has been placed into orbit, using a deployment mechanism. The parent spacecraft may maneuver into a desired orbit and thereafter, the deployment mechanism may apply a force to push the satellite away from the parent spacecraft.

In recent years, the miniaturization of various technologies has enabled the construction of smaller satellites that have the same functionality as previously only available to larger satellites. In addition to the nanosatellite example given above, other examples of small satellites include picosatellites (e.g., 100 g to 1 kg) and some smaller classifications as well. Cube satellites, or CubeSats, cover a range of 0.2 kg to 40 kg typically and exist in various standard sizes, measured in standard units, or quantity of U. Given their small mass and the associated costs for launching a single satellite into orbit, many dispensing (or deployment) devices have been developed to enable the deployment of CubeSats.

Small scale satellite dispensers typically have a shape, size, and form factor to accommodate a corresponding small-scale satellite, such as a certain unit size, and commonly have a door that provides access to a payload area of the satellite dispensing device, and a means of securing the satellite inside during exposure to the launch environment to prevent the satellite being damaged from excessive "rattling". This single form factor to single satellite type constraint has the obvious drawback that anyone flying multiple sizes of satellite must have multiple different dispensers on hand at any one time to accommodate all the possible configurations within the CubeSat standard.

The satellite is typically loaded into the dispenser through the opening associated with the door and the dispenser may incorporate "access panels" along the structure of the deployer to allow some access to the satellite once it is in the deployer, such as to arm the satellites ahead of flight. This approach to loading and accessing the satellite has many short-comings, such as providing limited access to satellite and also increasing the risk of damage to the satellite during loading into the dispenser since you must go through the door and not contact any extraneous hardware which may be present.

Once in the satellite dispenser, a means of securing the satellite during exposure to the launch environment is typically employed such as externally adjustable payload restraints (jackscrews), U.S. Patent 20190039757A1, or clamping tabs, U.S. Patent 20140319283A1. Utilizing a plurality of jackscrews has the apparent drawback that they introduce a risk of jamming due to uneven loading during the operation of torquing and locking them. Utilizing a single jackscrew to alleviate this concern as some have introduces the need for a load-distributing pusher plate which is mass inefficient. The utilization of clamping tabs make a satellite incompatible with the majority of CubeSat dispensers on the market making them unappealing to most satellite manufactures.

The disclosed subject matter helps to avoid these and other problems.

SUMMARY OF THE INVENTION

This disclosure relates generally to a modular CubeSat dispenser with novel features that enable universal compatibility within a single CubeSat dispenser system.

The main advantage of using the invention is the provision for a novel means of utilizing a single dispenser system to accommodate a plurality of satellite form factors in a mass efficient way that provides superior access to the satellite and ease of loading into the device.

DETAILED DESCRIPTION OF THE INVENTION

The inventive device utilizes the combination of a clamshell structure, with an integral preloading mechanism which accommodates a constrained spacer system to enable conversion between various common unit size satellite in the same dispenser with any length CubeSat.

By utilizing a clamshell type structure, the user of the device can easily gain access to the interior of the device to change out the necessary parts to convert between different width satellites, within the same primary structure.

Additionally, this clamshell type structure, allows the user to place the satellite in from the completely open side of the dispenser or to slide it in from the door side without risk of hitting the sides of the dispenser.

Additionally, this allows the user to have access to almost the entire satellite while it's in the dispenser.

Additionally, the door can be held shut by external tooling or integral features to the dispenser, to allow the door to be held closed, constraining the satellite even while the clamshell is removed. The clamshell can then be mated back to the other half of the dispenser and the door locked for flight without removing the satellite.

The use of a low-profile, integral preloading mechanism, referred to generally as a "puck", allows the satellite to be constrained inside the dispenser through the critical load path of a typical pusher plate utilized for coil spring powered dispensers, avoiding unnecessary mass in the pusher plate.

This also prevents the satellite from being unevenly loaded inside the dispenser, preventing jamming against the rails.

Additionally, an easy to manufacture cylindrical spacer of any length can be attached to the puck to accommodate any length satellite including non-standard lengths while maintaining an ideal load path.

Additionally, if so desired, a tapered interface on the door may be added to enable this puck to preload the satellite into the rails for a more statically determinate load transfer, though this may-or-may not be desired depending on user preference as this may make analysis of the satellite structure easier, but typically imparts more energy to the satellite instead of allowing it to dissipate through "scrubbing" in the unconstrained axis.

Additionally, multiples of the device may be joined together to create a quad-pack type configuration while still maintaining the novelty of the device.

Additionally, the clamshell may further break down to allow for additional adjustability such as with spacers to allow increased volume in any direction or for replacement of side plates to allow stretched height without the addition of spacers.

Additionally, multiple smaller doors may be used across configurations to reduce unique parts or a single larger door may be utilized depending on the preference of the user.

Additionally, the door or doors may be swapped for any configuration of door desired while still maintaining the novel features of the device.

Additionally, the doors may utilize any type of actuator convenient to the application that doesn't prevent utilization of the novel features of the device.

BRIEF DESCRIPTION OF THE DRAWINGS

A more complete understanding of the invention and the many attendant advantages thereof will be readily appreciated as the same becomes better understood by reference to the following detailed description, when considered in connection with the accompanying drawings wherein.

DESCRIPTION OF THE PREFERRED EMBODIMENT

Figure 1:
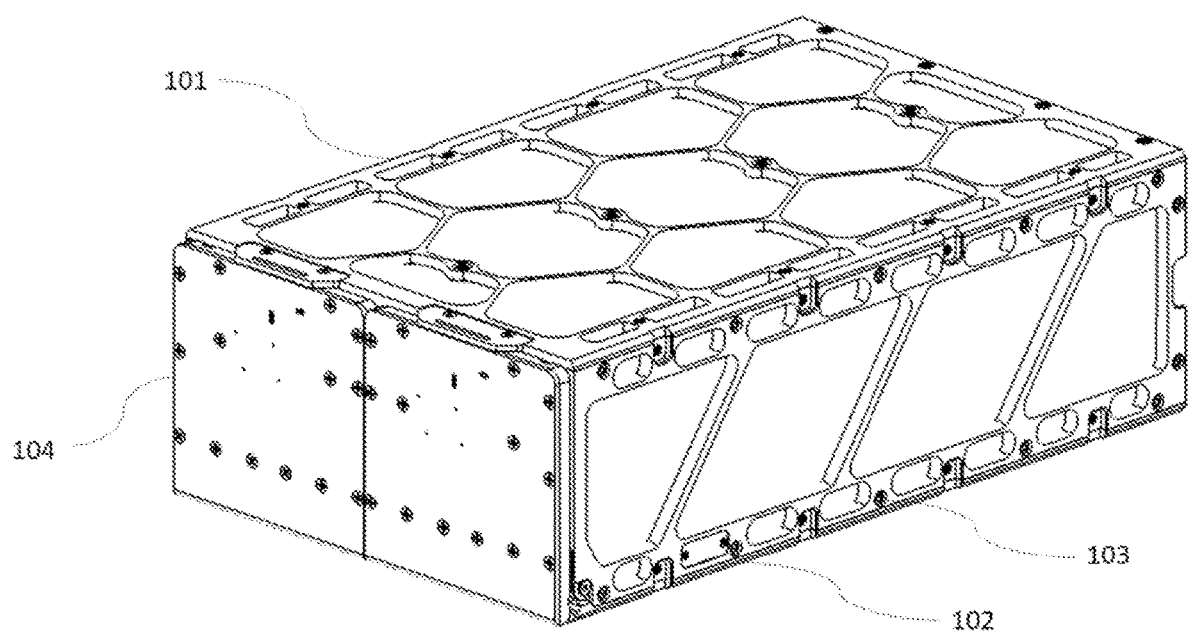
FIG. 1 is an isometric view of the first embodiment prior to conversion.

In FIG. 1 the inventive device utilizes a fasteners 103 to fasten clamshell halves 101 and 102 together capturing doors 104 in their locked state.

Figure 2:
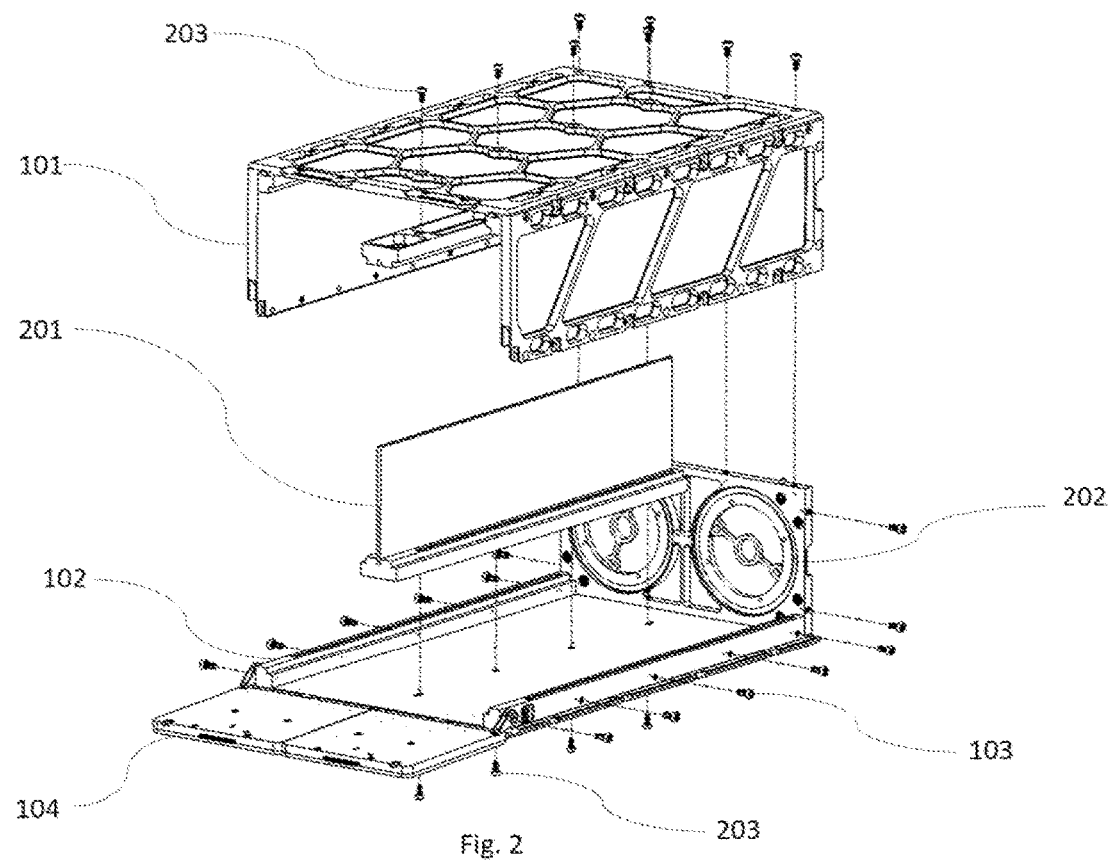
FIG. 2 is an exploded view showing the first embodiment in its convertible state.

In FIG. 2 the inventive device has been separate into its constituent subsystems for conversion through removal of fasteners 103 and 203 to allow clamshell halves 101 and 102 to separate, doors 104 to open, such that conversion element 201 may be removed. Threaded preloading mechanism 202 can be seen threaded into the back of clamshell half 102.

Figure 3:
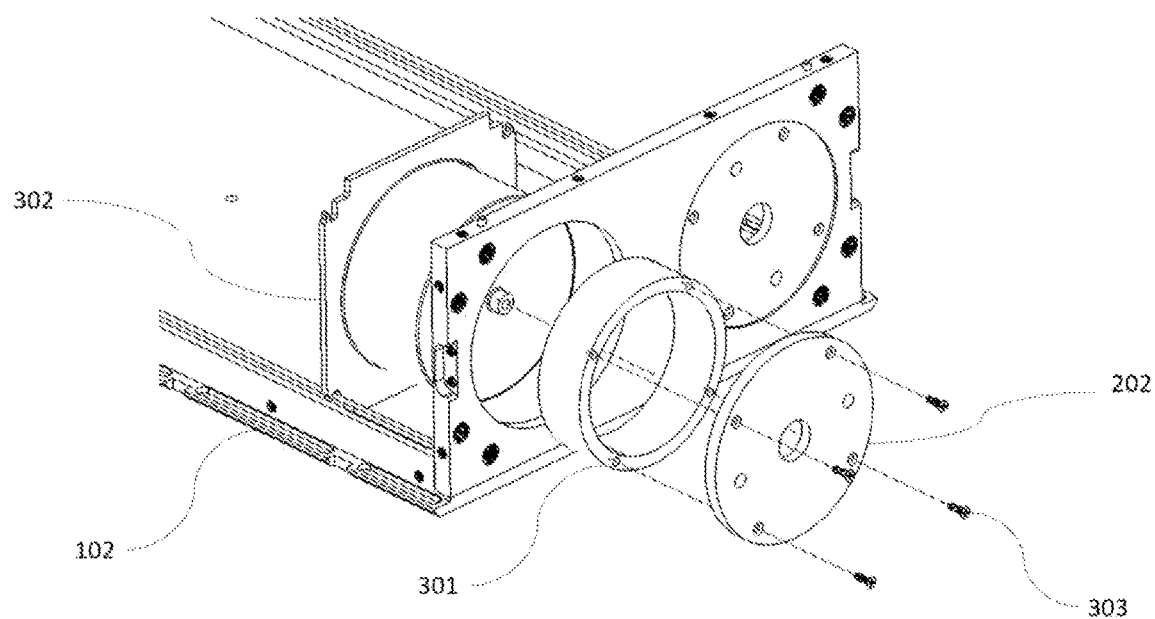
FIG. 3 is an exploded view showing the first embodiment after removal of the conversion elements, but with the addition of the spacer system.

In FIG. 3 spacer 301 has been fastened to preloading mechanism 202 with fasteners 303, causing pusher plate 302 to extend into the body of the dispenser further to accommodate a shorter satellite.

Figure 4:
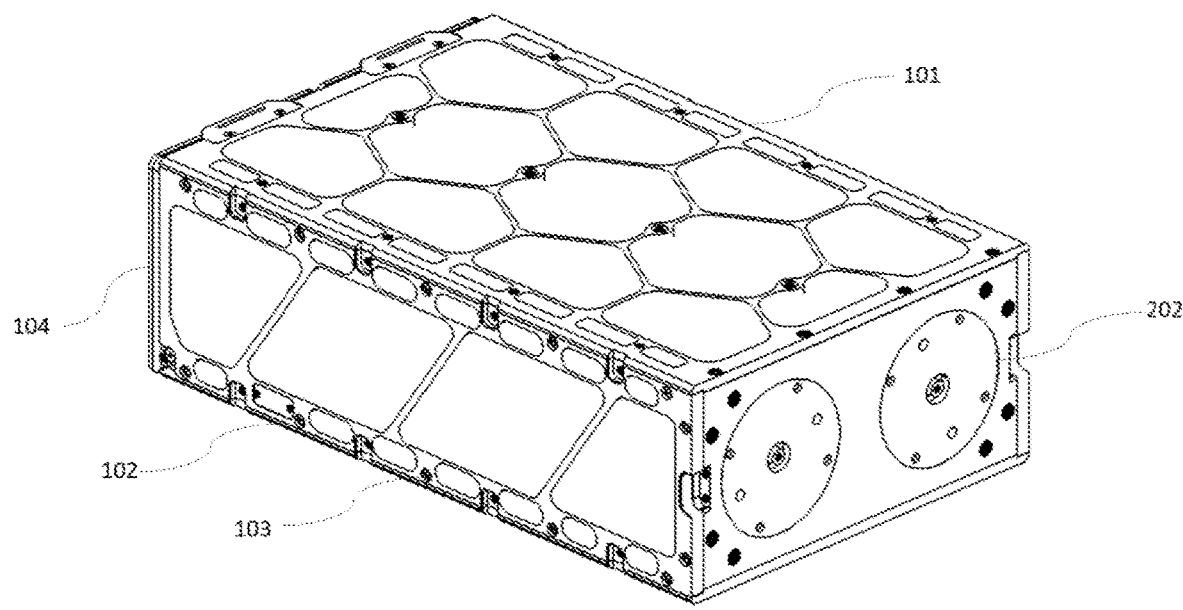
FIG. 4 is a rear isometric view showing the first embodiment after conversion.

In FIG. 4 the inventive device has been closed back up with a satellite inside (not shown) by fastening clamshell halves 101 and 102 together with fasteners 103. Preloading mechanism 202 has been turned with a spanner wrench (not shown) to apply a preload to the satellite inside the dispenser.'

Figure 5:
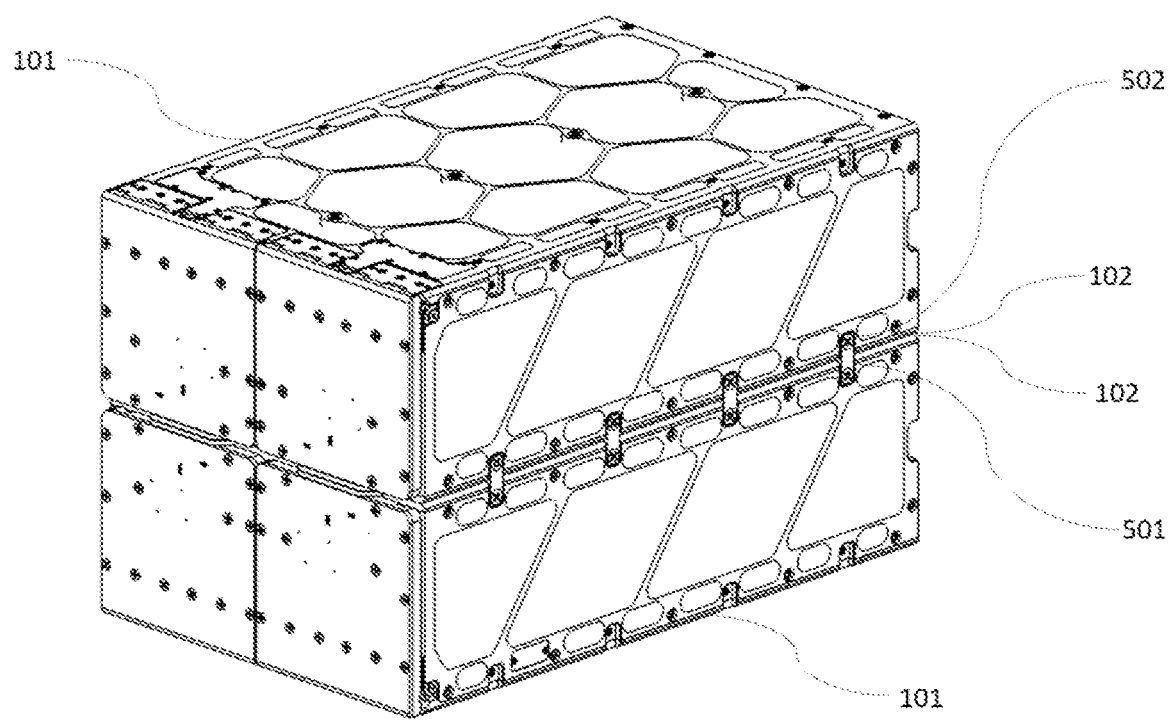
FIG. 5 is an isometric view of the first embodiment in a quad pack configuration.

In FIG. 5 the inventive device has been configured in a quad pack configuration by fastening two dispensers together by the addition of joiner plates 501 and fasteners 502.

The inventive device enables users of CubeSat dispensers to only need a single system to fly multiple widths and lengths of satellites through the use of clamshell structure 101 and 102 to gain access to the inside of said CubeSat dispenser, a removable conversion element 201 to allow different width satellites to be accommodated, preloading mechanism 202 to preload the satellite(s) from a single point, and spacer 301 to accommodate different length satellites.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A universal CubeSat dispensing device, comprising:
   a clamshell structure, wherein said clamshell structure comprises two clamshell halves, wherein said two clamshell halves comprise a first clamshell and a second clamshell, wherein said first clamshell is a base structure, wherein said second clamshell comprises sidewalls and a top structure, and wherein said first clamshell and said second clamshell are held together to form said clamshell structure;
   a removable conversion element;
   a preloading mechanism connected to said second clamshell; and
   a spacer system connected to said preloading mechanism, wherein said clamshell structure, said removable conversion element, said preloading mechanism, and said spacer system allow to access and load one or more satellites into said universal CubeSat dispensing device via said sidewalls, said preloading mechanism, or via an opposite end of said preloading mechanism, and
   wherein said clamshell structure, said removable conversion element, said preloading mechanism, and said spacer system allow said universal CubeSat dispensing device to convert between various widths and lengths of said one or more satellites in a single system.

2. The universal CubeSat dispensing device of claim 1, wherein said spacer system comprises a pusher plate.

3. The universal CubeSat dispensing device of claim 2, wherein said spacer system fastens to said preloading mechanism with second fasteners to accommodate a shorter satellite of said one or more satellites.

4. The universal CubeSat dispensing device of claim 1, further comprises a second universal CubeSat dispensing device, wherein said second universal CubeSat dispensing device is fastened to said universal CubeSat dispensing device in a quad pack configuration.

5. The universal CubeSat dispensing device of claim 4, wherein said universal CubeSat dispensing device and said second universal CubeSat dispensing device are fastened using joiner plates.

6. The universal CubeSat dispensing device of claim 1, further comprises doors configured for placing said one or more satellites into said universal CubeSat dispensing device.

7. The universal CubeSat dispensing device of claim 6, wherein said doors comprise an actuator, and wherein said actuator operates said doors.

8. The universal CubeSat dispensing device of claim 6, wherein said two clamshell halves are held together to form said clamshell structure by first fasteners in a locked state, and wherein said first fasteners are removed to separate said two clamshell halves, open said doors and remove said removable conversion element from said universal CubeSat dispensing device.

9. A universal CubeSat dispensing device, comprising:
a clamshell structure, wherein said clamshell structure comprises two clamshell halves, wherein said two clamshell halves comprise a first clamshell and a second clamshell, wherein said first clamshell is a base structure, wherein said second clamshell comprises sidewalls and a top structure, and wherein said first clamshell and said second clamshell are held together to form said clamshell structure;
a removable conversion element;
a preloading mechanism connected to said second clamshell;
a spacer system connected to said preloading mechanism;
doors connected to said two clamshell halves,
wherein said clamshell structure, said removable conversion element, said preloading mechanism, said doors, and said spacer system allow to access and load one or more satellites into said universal CubeSat dispensing device via said sidewalls, said preloading mechanism, or via an opposite end of said preloading mechanism,
wherein said clamshell structure, said removable conversion element, said preloading mechanism, and said spacer system allow said universal CubeSat dispensing device to convert between various widths and lengths of said one or more satellites to fit in a single system; and
wherein said doors are configured for placing said one or more satellites into said universal CubeSat dispensing device.

10. The universal CubeSat dispensing device of claim 9, wherein said two clamshell halves are held together to form said clamshell structure by first fasteners in a locked state, and wherein said first fasteners are removed to separate said two clamshell halves separate, open said doors and remove said removable conversion element from said universal CubeSat dispensing device.

11. The universal CubeSat dispensing device of claim 9, wherein said two clamshell halves are held together with the help of first fasteners to form said clamshell structure.

12. The universal CubeSat dispensing device of claim 9, wherein said spacer system comprises a pusher plate.

13. The universal CubeSat dispensing device of claim 12, wherein said spacer system fastens to said preloading mechanism with second fasteners to accommodate a shorter satellite of said one or more satellites.

14. The universal CubeSat dispensing device of claim 9, further comprises a second universal CubeSat dispensing device, wherein said second universal CubeSat dispensing device is fastened to said universal CubeSat dispensing device in a quad pack configuration.

15. The universal CubeSat dispensing device of claim 14, wherein said universal CubeSat dispensing device and said second universal CubeSat dispensing device are fastened using joiner plates.

16. The universal CubeSat dispensing device of claim 9, wherein said doors comprise an actuator, and wherein said actuator operates said doors.

17. A method of providing a universal CubeSat dispensing device, said method comprising steps of:
providing a clamshell structure having two clamshell halves, said two clamshell halves comprising a first clamshell and a second clamshell, said first clamshell being a base structure, said second clamshell half comprising sidewalls and a top structure, wherein said first clamshell and said second clamshell are held together to form said clamshell structure;
providing a removable conversion element;
providing a preloading mechanism connected to said second clamshell;
providing a spacer system connected to said preloading mechanism;
accommodating various lengths and widths of one or more satellites with said spacer system, said preloading mechanism and said removable conversion element; and
allowing access to said one or more satellites through said clamshell structure.

\* \* \* \* \*